United States Patent [19]

Shibata

[11] Patent Number: 4,707,211

[45] Date of Patent: Nov. 17, 1987

[54] LINERLESS THERMAL LABEL PRINTER AND APPLICATOR

[75] Inventor: Tomoo Shibata, Irvine, Calif.

[73] Assignee: Ricoh Electronics, Inc., Santa Ana, Calif.

[21] Appl. No.: 827,621

[22] Filed: Feb. 10, 1986

[51] Int. Cl.[4] ........................ B26D 5/20; B32B 35/00

[52] U.S. Cl. ........................ 156/354; 156/355; 156/360; 156/362; 156/384; 156/497; 156/499; 156/521; 156/DIG. 21; 156/DIG. 31; 156/DIG. 36; 156/DIG. 38; 346/9; 346/25; 346/76 PH

[58] Field of Search ............... 156/354, 355, 360, 362, 156/384, 387, 499, 521, DIG. 21, DIG. 31, DIG. 36, DIG. 38, DIG. 49, DIG. 51, 497; 346/9, 25, 75, 76 PH

[56] References Cited

U.S. PATENT DOCUMENTS

| | | | |
|---|---|---|---|
| 2,492,908 | 12/1949 | Von Hofe | 156/DIG. 31 |
| 3,232,804 | 2/1966 | Klopfenstein et al. | 156/DIG. 21 |
| 3,955,481 | 5/1976 | Heitmann | 156/521 |
| 3,984,277 | 10/1976 | French et al. | 156/DIG. 38 |
| 4,035,808 | 7/1977 | Karp | 346/9 |
| 4,370,370 | 1/1983 | Iwata et al. | 428/40 |
| 4,388,362 | 6/1983 | Iwata et al. | 428/211 |
| 4,424,245 | 1/1984 | Maruta et al. | 428/40 |
| 4,444,819 | 4/1984 | Maruta et al. | 346/209 |
| 4,468,274 | 8/1984 | Adachi | 156/DIG. 21 |
| 4,526,648 | 7/1985 | Tochtermann | 156/DIG. 38 |
| 4,581,094 | 4/1986 | Sato | 156/DIG. 38 |
| 4,590,497 | 5/1986 | Shibata et al. | 346/201 |

*Primary Examiner*—Caleb Weston
*Attorney, Agent, or Firm*—Walter A. Hackler

[57] ABSTRACT

A thermal printer and label applicator includes a transport system for moving linerless thermosensitive paper from a stack or roll thereof to a printing station and a cutting station. Thermal print head at the printing station is provided to imprint a preselected heating pattern in the linerless thermosensitive paper in order to form desired visible images thereon. A cutter is provided to separate the linerless thermosensitive paper into individual labels, and a vacuum system transports the separated individual labels from the cutting station to an adhesive activation station and thereafter to a label ejection station. At the adhesive activation station, a heater is provided to activate a delayed action adhesive on the label and thereafter a vacuum/blower system at the label ejection station causes airborne transport of the individual separated labels onto goods which have been placed in receiving position by a conveyor system. Operation of the thermal printer and label applicator is coordinated by a control system.

9 Claims, 8 Drawing Figures

LINERLESS THERMAL LABEL PRINTER AND APPLICATOR

The present invention relates generally to thermosensitive paper and, more particularly, to a thermal printer and label applicator utilizing linerless thermosensitive label stock.

Labels for price and weight marking of goods are in widespread use throughout the world. Often an on-site printer is utilized to imprint the labels with the price and weight of goods onto which the labels are attached.

In many instances, individual goods are packaged on-site by slicing or separating them from a larger piece, and thereafter weighed and wrapped. A label is then printed at the distribution, or sale site, and attached to the wrapped goods.

The use of conventional printing systems using oily or water-based inks may be very messy operation because smearing of the labels can occur if insufficient drying time is not provided after printing and before the label is used on goods. In addition, the handling of wet inks, or ink impregnated ribbon, often contaminates the work area which is not desirable in a retail store, such as a supermarket, or the like.

These problems have been overcome through the development of thermosensitive recording labels.

Additional problems, however, are associated with the sticking, or adhesion, of labels to goods. If the labels are dry, and glue is applied to the labels at the printing site, a messy operation is sure to occur.

To avert this situation, labels typically are produced with an adhesive thereon, so that application is not necessary at their point of use.

It can be easily appreciated that if this glue must be wetted in order to stick the label to goods, another messy operation is encountered.

Hence, to avert these messy operations, pressure-sensitive adhesives have been utilized on such labels. Naturally, a releasable backing sheet is disposed on such pressure-sensitive adhesives in order to prevent agglomeration of the labels before their use. After imprinting, the labels are stripped from the backing strip and applied to the goods.

While use of pressure-sensitive adhesives with backing strips thereon eliminates a great deal of the mess problems associated with prior art labels, still more problems are introduced.

Since the releasable backing sheet constitutes a large volume compared to the label, increased volume and associated weight must be accounted for during the handling and utilization of the labels.

Additionally, after the releasable backing sheet, or liner, is removed from the label, it must be disposed of.

There is no question that this is an inefficient use of paper stock and further contributes to the overall cost of label manufacture, as well as contributing significantly to the shipping and storing costs, and later disposal of the backing sheet.

For example, applicator apparatus utilizing conventional labels must provide a device for separating the individual labels from the liner, or backing sheet, and a device for rewinding the backing sheet after the labels have been separated therefrom.

This results in apparatus having a larger overall size to accommodate these devices.

To improve the efficiency in the weighing and marking of goods by labels, thermosensitive recording labels have been developed which eliminate the releasable backing sheet typically found on labels. Such a label is described in U.S. Pat. No. 4,590,497. This label has no backing sheet and hence may be termed a "linerless" label.

The linerless label utilizes delayed action adhesives. These delayed action adhesives may be of an emulsion or a hot melt type and coated onto label stock and thereafter activated by heating the adhesive.

The delayed action adhesive is sensitive to heat and not only becomes tacky upon heating thereof, but remains tacky for a preselected period of time thereafter depending upon the composition of the adhesive. Because the delayed action adhesive may be heated radiantly, or convectively, no contact need be made therewith, hence, eliminating the possibility of adhesive buildup on unwanted portions of equipment utilized for activating the adhesive, such as with non-pressure-sensitive adhesives which must be wetted in order to place them into a tacky state for adhering.

Naturally, this type of label presents yet another set of problems relating to the printing, handling and application of the label to goods.

This type of label is doubly thermosensitive. First, it is sensitive to heat in order to create images therein and secondly, it is sensitive to heat in order to activate the adhesive thereon.

It is apparent that in order for the label to be useful, thermal images must be created therein without activating the adhesive and the adhesive must be activated without obliterating the images created thereon. Additionally, since there is no liner or backing sheet, the label must be handled and applied to the goods without touching the activated adhesive, otherwise the labels may be stuck to unwanted pieces of equipment and/or the equipment contaminated with the glue.

The present invention is directed to apparatus for use in the on-site printing and application of linerless labels. The apparatus is particularly useful in combination with the label described in U.S. Pat. No. 4,590,497 for the weighing and labeling of individual goods at point of sale locations, such as supermarkets, without mess and with significantly reduced handling equipment since there is no liner, or backing sheet, which must be disposed of during the weighing and labeling operation.

SUMMARY OF THE INVENTION

A thermal printer and label applicator in accordance with the present invention includes transport means for moving linerless thermosensitive paper from a stack, or roll, thereof to a printing station and a cutting station.

Thermal print head means are provided and disposed at the printing station for causing a preselected heating pattern in the linerless thermosensitive paper in order to form desired visible images thereon.

Cutting means provided at the cutting station enable cutting of the linerless thermosensitive paper into separated individual labels with visible images thereon, and vacuum means are provided for transporting the separated individual labels from the cutting station to an adhesive activation station and thereafter to a label ejection station.

At the adhesive activation station, heating means are provided for heating the delayed action adhesive disposed on the separated individual labels in order to cause the delayed action adhesive to become tacky.

Thereafter, vacuum/blower means which are disposed at the label ejection station causes discharge of the individual separated labels with tacky adhesive thereon.

Additionally, conveyor means may be provided for placing the goods in a position to receive the airborne labels and the conveyor means may include weighing means for determining the weight of the goods.

Control means may be provided and interconnected with the transport means, thermal print head means, cutting means, vacuum means, heating means, vacuum/blower means and conveyor means for synchronizing the operation thereof so that the weight of the goods is indicated by the desired visible image created on the separated individual labels and the individual labels are placed on corresponding goods having the indicated weight.

The thermal printer and label applicator may be provided with perforated belt means which are disposed in an operative relationship with the vacuum means and the vacuum/blower means for enabling air flow through the belt via the perforations therein from a side on which the individual separations are held to an opposite side thereof. This air flow may be controlled in order to provide cooling of the belt. This is important in order to prevent the creation of undesired visible images in the separated individual labels by the heated belt.

More particularly, the linerless thermosensitive recording paper used in combination with the thermal printer and applicator includes a substrate, a thermosensitive color-forming layer disposed on one side of the substrate, a heat-reflecting layer disposed on another side of the substrate, and a delayed action adhesive disposed on the heat-reflecting layer.

The heat reflecting layer is operative in both preventing the activation of the delayed action adhesive when the thermal print head is operative for causing a preselected heating pattern in the thermosensitive color-forming layer on the thermosensitive recording paper and for preventing undesired visible images in the thermosensitive color-forming layer when the heating means is operative for activating the delayed action adhesive.

The vacuum means and the vacuum/blower means are disposed in a spaced-apart relationship and the vacuum/blower means is configured for reversing the air flow through the perforated belt in order to blow the separated individual labels therefrom in response to a signal from the control means.

The transport means includes a pair of drive rollers disposed for engaging the thermosensitive recording paper therebetween and for moving unsupported thermosensitive recording paper to a position for engagement with the thermal print head means.

In order to thread the thermosensitive paper between the drive rollers and thereafter in engagment with the thermal print head means in an expedited manner, lever means are provided for coordinated engagement and disengagement of the thermal print head means and the drive roller means with the thermosensitive recording paper.

The lever means includes a first and a second lever with the first lever having one end thereof attached with thermal print head and the second lever having one end thereof attached to one of the drive rollers.

An opposite end of each of the first and second levers is attached to a common shaft, with each lever being mounted on a first and second pivot, respectively. The first and second pivots are disposed between the thermal print head and the drive roller means and the lever means further includes means for moving the shaft in order to cause the first and second levers to rotate about the first and second pivot points, respectively, to simultaneously engage and disengage the thermal print head means and the drive roller means with the thermosensitive recording paper.

A method in accordance with the present invention for marking the thermosensitive labels for identification of goods includes the steps of: providing thermosensitive recording paper having a thermosensitive color-forming layer on one side thereof, a delayed action heat-sensitive adhesive on another side thereof, and a heat reflecting layer therebetween; and heating protions of the thermosensitive color-forming layer to cause desired images therein without activating the delayed action adhesive to a tacky state. Activation of the delayed action adhesive is prevented by the heat-reflecting layer.

Thereafter, the thermosensitive paper is cut into individual separated labels with desired images thereon.

The delayed action adhesive is then heated to activiate it to a tacky state without creating undesired visible images in the thermosensitive color-forming layer, the creation of undesired visible images in the thermosensitive color-forming being prevented by the heat-reflecting layer.

BRIEF DESCRIPTION OF THE DRAWINGS

A better understanding of the present invention may be had with the consideration of the following detailed description, taken in conjunction with the accompanying drawings in which.

DETAILED DESCRIPTION

Figure 1:
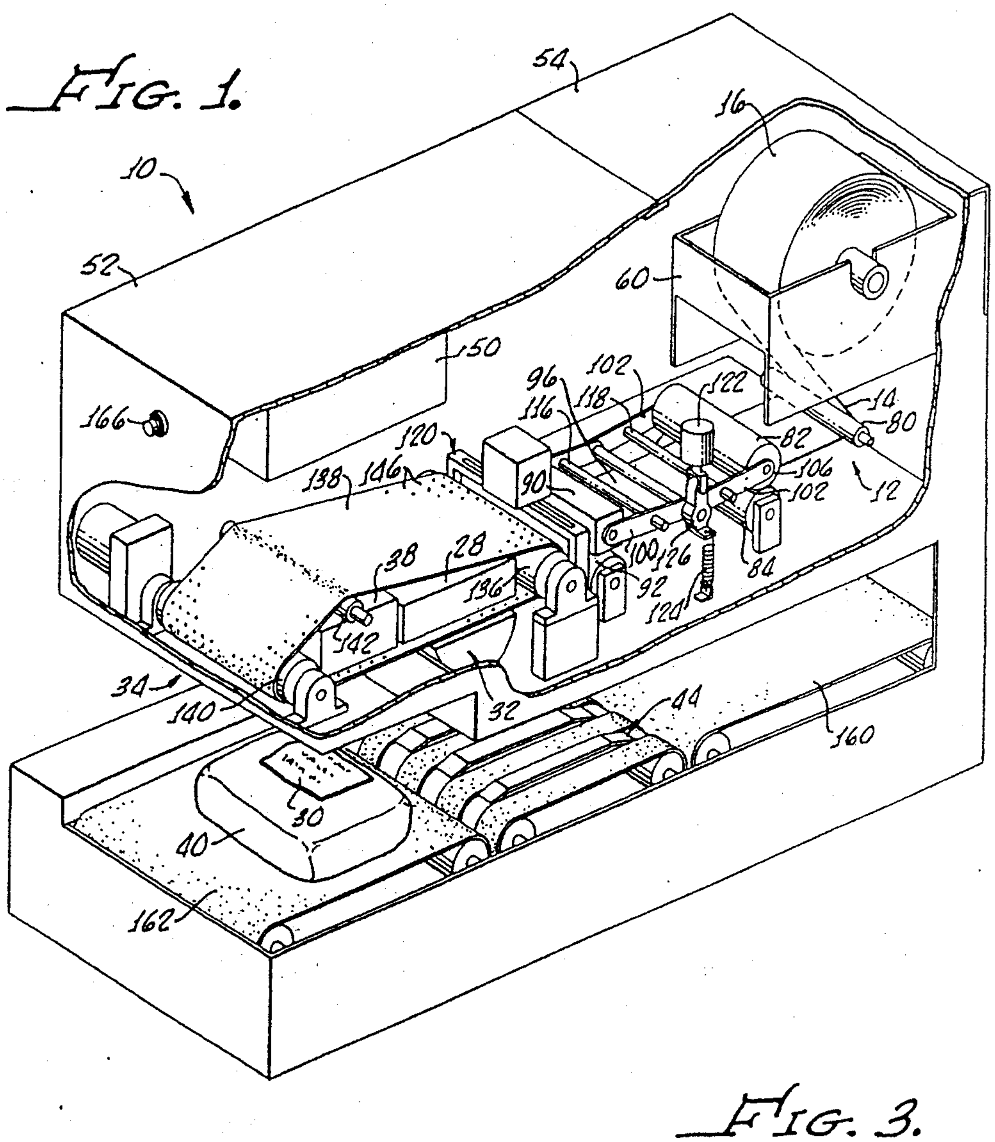
FIG. 1 is a perspective partially cut-away view of the thermal printer and label applicator in accordance with the present invention, generally showing transport means for moving linerless thermosensitive paper, cutting means, vacuum means, vacuum means for transporting separated individual labels from a cutting station to an adhesive activation station, heating means for activating the delayed action adhesive, vacuum blowing means for causing airborne transport of the individual separated labels, conveyor means, and a schematic representation of control means for coordinating the hereinabove-recited elements of the present invention.
Figure 2:
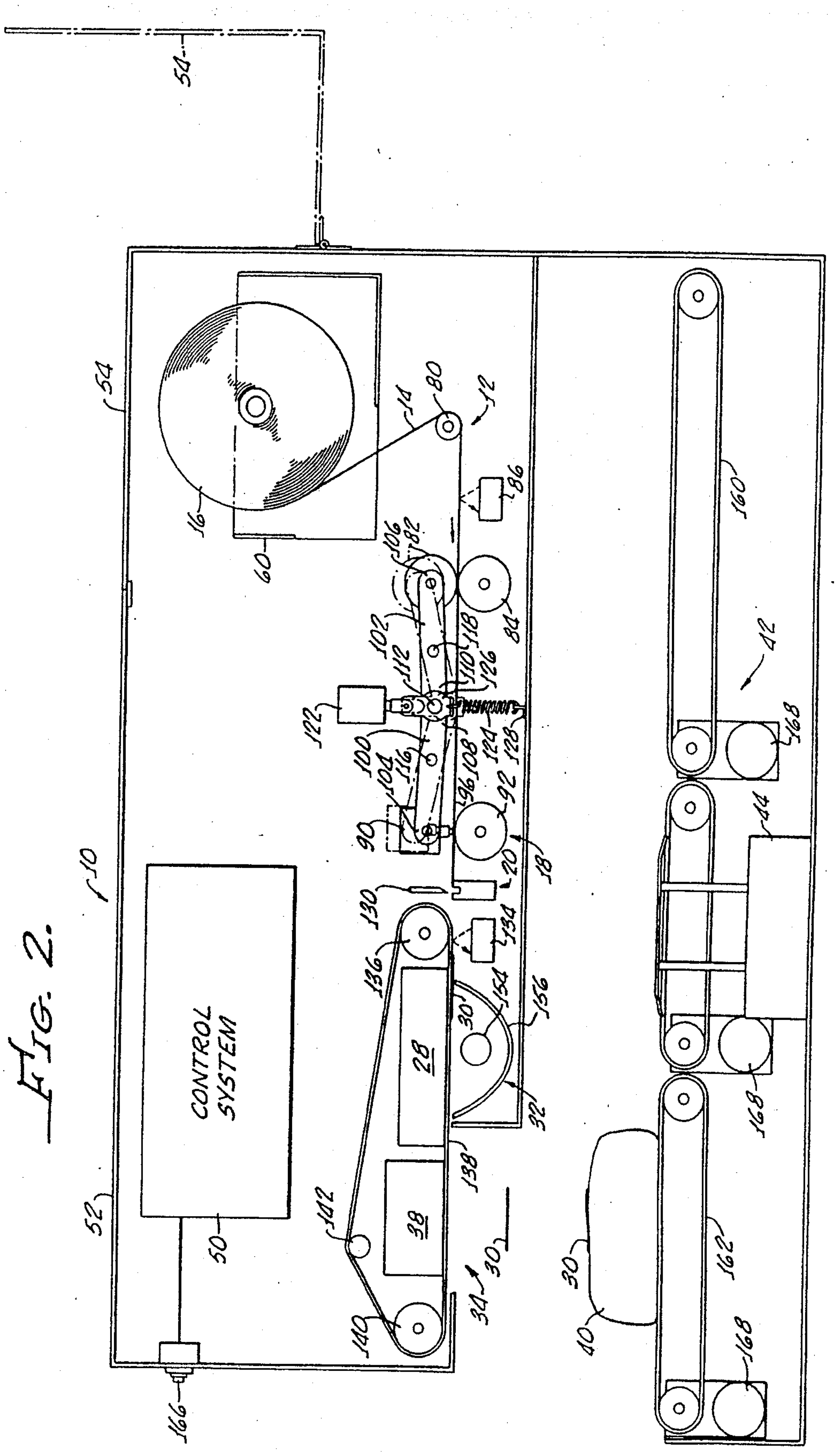
FIG. 2 is a cross-section view of the thermal printer label applicator.

Turning now to FIG. 1 and FIG. 2, there is shown a thermal printer and label applicator 10 in accordance with the present invention, generally including a transport system 12, which provides means for moving liner-

BEST AVAILABLE COPY less thermosensitive paper 14 from a stack, or roll 16 thereof, to printing station 18 and a cutting station 20.

A vacuum system 28 provides means for transporting separated individual labels 30 from the cutting station 20 to an adhesive activation station 32 and thereafter to a label ejection station 34.

A vacuum/blower system 38 disposed at the label ejection station 34 provides means for causing airborne transport of the individual separated labels with tacky adhesive onto goods 40.

A conveyor system 42 provides means for placing the goods 40 in the position to receive the airborne labels 30, as well as including a scale 44 for weighing the goods 40 during a transit thereacross.

As will be described hereinafter in greater detail, a control system 50 is provided in order to coordinate operation of the thermal printer and label applicator in order that the weight of the goods 40 is indicated by a desired visible image (not shown) created on the separated individual labels 30 which are placed on corresponding goods 40 having the indicated weight.

The thermal printer and label applicator 10 may be mounted and disposed within any suitable housing 52, which is configured for enabling goods 40 to be moved into and out of an operational relationship with the thermal printer and label applicator 10 during the use thereof.

As may be convenient, a hinged lid 54 may be provided for enabling access to the interior of the housing, thus providing accessibility to a rack 60 to replace the roll 16 of linerless tape supported thereby.

The linerless thermosensitive paper 14 used by the thermal printer and applicator 10 may be considered an integral part thereof, because the operation and usefulness of the thermal printer and applicator is enabled by the specific linerless thermosensitive paper. This paper 14 is described in U.S. Pat. No. 4,590,497 which is incorporated herewith by specific reference thereto.

Figure 3:
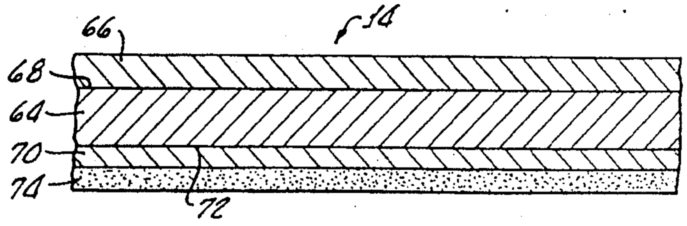
FIG. 3 is a cross-section view of a linerless thermosensitive paper suitable for use in combination with the thermal printer and label applicator.

Briefly, as shown in FIG. 3, the linerless thermosensitive paper 14 includes a subs[illegible], a thermosensitive color-forming layer 66 dispos[illegible] one side 68 of the substrate, a heat-reflecting layer [illegible] disposed on an opposite side 72 of the substrate, and a delayed action adhesive 74 disposed on the heat-reflecting layer.

As discussed in the hereinabove-referenced patent application, the delayed action adhesive is sensitive to heat and becomes tacky upon the application of heat thereto. Additionally, the delayed action adhesive remains tacky for a period of time after the application of heat, with the duration of tackiness dependent upon the composition of the delayed action adhesive.

Because the delayed action adhesive remains tacky for a period of time after the heating thereof, its application to the goods 40 is enabled as will be hereinafter discussed in greater detail.

A significant advantage in the use of linerless thermosensitive paper lies in the fact that substantial volume, weight, handling and material costs associated with the manufacture and use of the linerless thermosensitive paper occurs because of the elimination of a liner, or backing sheet, typically used with thermosensitive paper having a pressure-sensitive adhesive for attaching the finished labels to goods.

Thus, as can be seen from FIGS. 1 and 2, there is no waste product, namely, discarded liner, associated with the use and operation of the thermal printer and label applicator 10 in accordance with the present invention.

More specifically, the transport system 12 in accordance with the present invention includes a guide roller 80 for directing a linerless paper 14 into a pair of drive roller 82, 84. One or more of the drive rollers 82, 84 may be driven in any conventional manner (not shown) for pulling the linerless paper 14 from the rack 60 and around the guide roller 80 and thereafter into the printing station 18.

Since the linerless paper is not supported by an underlining backing paper, the drive rollers 82, 84 must feed the linerless paper 14 therefrom in an unsupported state toward the printing station 18. In comparison, in conventional label printing apparatus (not shown) the liner, or backing sheet, provides a transport webb, or carrier, as the paper is moved. Hence, the individual labels in a conventional printer, using thermosensitive paper with liner, continually supports the printed labels until they are removed from the backing strip.

Because the linerless paper must be fed in an unsupported state from the drive rollers 82–84, any curl therein which may occur because of its storage in a roll 16, must be removed.

This function is provided by the guide roller 80. At this point, the linerless paper 14 is bent in an opposite direction than it was held in during storage on the roll. The diameter of the roller 80, necessary for providing this uncurling function, will depend upon the thickness and stiffness of the specific linerless thermosensitive paper 14 utilized, and may be determined on a trial and error basis.

To determine the end of the thermosensitive paper 14, a conventional light emitting diode-type detector 86, or the like, may be provided and interconnected to the control system 50 in order to stop the thermal printer and label applicator 10 when the supply of linerless thermosensitive paper 14 is exhausted.

Downstream from the drive rollers 82–84 at the printing station 18, there is disposed a conventional print head 90 in an operative relationship with a guide roller 92 for the creation of desirable images in the color-forming layer 66 of the linerless thermosensitive paper 14 in a manner well known in the art.

As hereinbefore described, when the terminus of the linerless thermosensitive paper 14 passes the detector 86, the control system 50 stops operation of the thermal printer and label applicator 10. In order to facilitate the removal of a portion 96 of the label 14 between the drive rollers 82, 84 and the thermal print head 90 and to replace it with additional linerless thermosensitive paper 14, a first lever 100 and a second lever 102 are provided with one end 104 of the first lever 100 attached to the thermal print head 90 and an end 106 of the second lever 102 attached to the drive roller 82.

In addition, opposite ends 108, 110 of the levers 100, 102, repectively, are attached to a common shaft 112.

First and second pivots 116, 118 disposed between the drive roller 82 and the thermal print head 90 provide mounts for the levers 100, 102, respectively, and enable coordinate engagement and disengagement of the thermal print head means and the drive roller means with the thermosensitive recording paper 14 when the shaft 112 is moved upwardly and downwardly by solenoid 122 attached thereto.

A spring 124 interconnected between a shaft support 126 and a frame member 128 biases the shaft 112 downwardly to maintain disengagement of the thermal print head 90 and the guide roller 82 when power is turned off to the solenoid 122 by the control system 50. This is indicated with a broken line in FIG. 2.

After desired visible images are formed in the color-forming layer 66 of the linerless thermosensitive paper 14, the linerless paper is transported in an unsupported fashion from the printing station 18 to the cutting station 20 wherein a cutting blade 130, or the like, is provided, as is well known in the art, for cutting the imprinted linerless thermosensitive paper into individual separated labels 30.

It is of advantage to cut the paper into individual separated labels 30 before the adhesive is activated. Because cutting is due when the adhesive is not tacky, the cutting blade 130 is not contaminated with adhesive. Hence, little or no maintenance is required to keep it clean to enable free movement of the labels 30 therepast after cutting.

As the linerless thermosensitive paper 14 is pushed toward the adhesive activation station 32, it passes by a second detector 134 which may be of any suitable type, such as light emitting diode, for determining the presence of paper 14 between the cutting station 20 and the adhesive activation station 32.

Figure 4A:
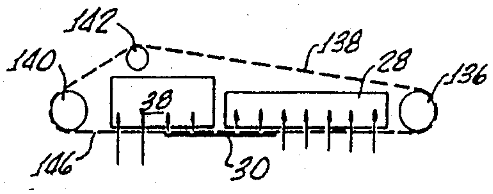
FIG. 4*a*, 4*b*, 4*c*, is an illustration of the operation of the vacuum and the vacuum/blower means for transporting individual separated labels and launching them in an airborne fashion onto goods positioned thereunder by the conveyor means.
Figure 4B:
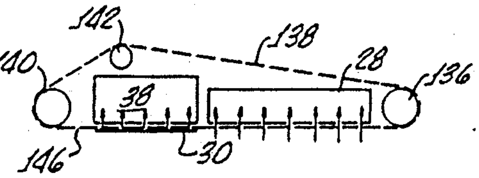

When such detection is made, the control system 50, which is interconnected to the detector 134, starts the vacuum system 28 in order to support the individual labels 30 against a perforated belt 138, which is disposed in an operative relationship with both the vacuum means 28 and the vacuum/blower means 34 by means of the roller 136 and rollers 140, 142 for enabling air flow through the belt via the perforations 146. (See FIG. 4*a*, 4*b*, 4*c*).

Figure 4C:
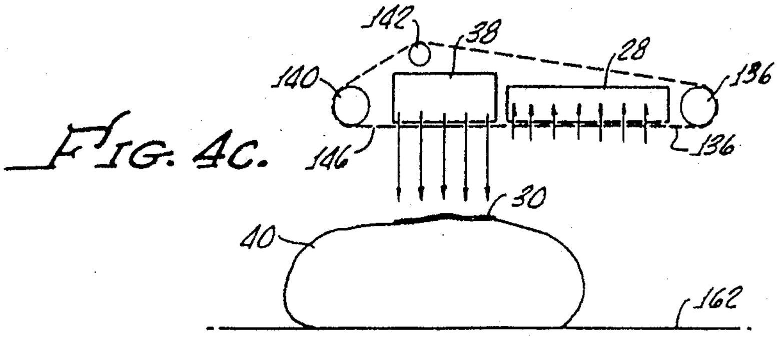

The vacuum system 28, vacuum/blower system 38, as well as the belt 138, may be designed in accordance with well known engineering principles for enabling the separated label 30 to be held against the belt while it passes along the adhesive activation station 32 and further to the ejection station 34 at which point the vacuum/blower system 38 is disposed. The vacuum/blower system 38 may be of any suitable configuration which is operative for reversing the air flow through the perforated belt 138 in order to blow the separated individual labels 30 therefrom, as illustrated in FIG. 4c, in response to a signal from the control means 50.

The airborne label 30 is thereby transferred onto the goods 40 without mechanical touching thereof.

Figure 5:
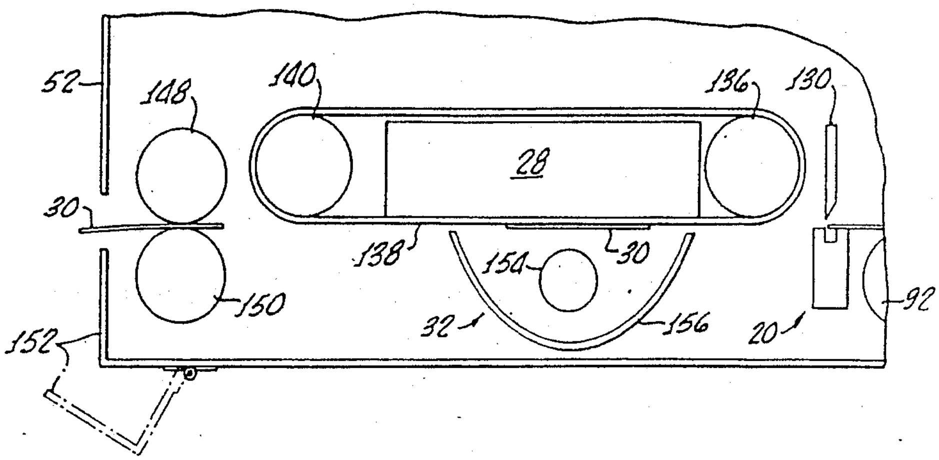
FIG. 5 is a cross-section of a portion of an alternative embodiment of the present invention including apparatus for discharging labels with activated adhesive thereon for manual application to goods; and, FIG. 6 is a diagram of the control sequence for coordinating the operation of the thermal printer and label applicator, as provided by the control means.

Alternatively, as shown in FIG. 5, the applicator 10 may be provided with a pair of motor-driven rollers 148, 150 instead of the vacuum blower 38 in order to discharge the individual labels 30.

Since it is expected that the rollers 148, 150 will retain some adhesive thereon, a hinged door 152 may be provided for convenient cleaning thereof from time to time. Other elements of the present invention shown in FIG. 5, which are identical to elements shown in FIGS. 1–4 and 6, are provided with identical reference numerals.

At the adhesive activation station 32, a heater 154 with a reflecting shield 156 thereabout is provided for directing heat onto the delayed action adhesive 74 on the label 30 in order to activate the adhesive to a tacky state.

It should be appreciated that the heat-reflecting layer 70 (see FIG. 3) prevents undesired visible images from forming in the color-forming layer 66, as described in U.S. Pat. No. 4,590,497.

This is of particular significance since the marking of the labels may include bar-type marking for the reading of the label by a laser device (not shown).

It should be appreciated that such automatic reading devices require distinctive black and white separations, or bars, in order to function. Hence, any blurring, bleeding, or graying of the color-forming layer caused by activation of the delayed action adhesive must be prevented, or the label will not function as intended in an automatic laser reading system.

The heat-reflecting layer 70 not only prevents heat from being transmitted from the heater 54 to the color-forming layer 66, it also functions in the same manner at the printing station in preventing heat from a thermal print head 90 from activating the delayed action adhesive disposed on an opposite side of the linerless thermosensitive paper 14.

If the delayed action adhesive were prematurely activated, the roller 92 would soon be contaminated with glue and the linerless paper 14 not fed properly to the cutting station 20.

The control system may be of any conventional electronic design for controlling and coordinating movement of the linerless thermosensitive paper and the conveyor system 42.

As shown in FIGS. 1 and 2, the conveyor system 42 may consist of a first conveyor 160 for conveying the goods 40 to a conveyor-type scale 44, and thereafter to a second, or exit, conveyor 162 for positioning the goods 40 to receive the airborne labels 30. The conveyors 160, 162, as well as the scale 44, may be of any appropriate conventional design.

In operation, goods are moved from the conveyor 160 onto the scale 44 at which point a signal corresponding to the weight of the goods 40 is transmitted to the control system 50 which operates to control the thermal head 90 in a conventional manner for imprinting the weight of the goods onto the linerless thermosensitive paper. Thereafter, the paper is cut into individual labels 30 at the cutting station 20 and passed over the adhesive activation heater 154 and then to the ejector station 34.

Simultaneously, the conveyor system 42 passed the goods from the scale 44 to the conveyor 162 at a position beneath the vacuum/blower 38 at a time, as controlled by the control system 50, at which the air flow through the perforated belt 138 is reversed and the label 30 is airborne delivered onto the goods 40, the tacky surface of the adhesive causing adhesion of the label 30 to the goods 40. Thereafter, the goods are moved outwardly from the thermal printer and label applicator 10 by the conveyor 162.

Figure 6:
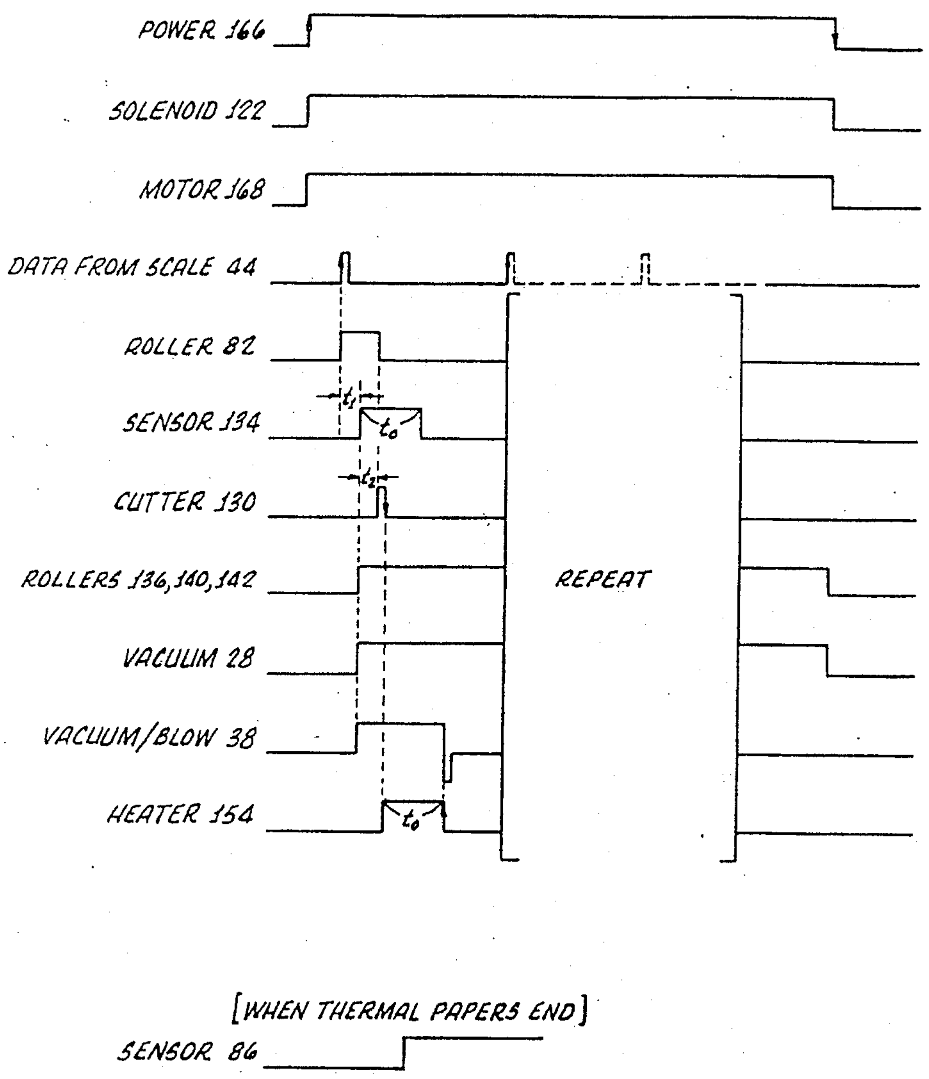

A control diagram, or timing chart, for the system is provided in FIG. 6. In operation, when a power switch 166 (FIGS. 1 and 6) is turned on, the solenoid 122 (FIG. 2 and 6) is activated so that the thermal head 90 and the roller 82 engage the linerless thermosensitive paper 14.

At that same instant, the motors 168 conventionally coupled to the conveyor belts 160, 162 and the scale 44, are started to transport goods along the conveyor system 42 and across the scale 44.

As the data from the scale 44 is read, roller 82 is activated, or rotated, thereby feeding unsupported linerless thermosensitive paper 14 into the printing station 18 where printing occurs. At a time $t_1$ thereafter, the sensor 134 detects the leading end of the linerless thermosensitive paper 14 and the control means at a preselected time $t_2$, which is adjustable depending on the length of the label desired, thereafter activates the cutting blade 130 in order to sever the paper 14 into individual labels 30 simultaneously with the detection of the leading end of the label at the sensor 134.

Rollers 136, 140, 142 are activated to transport the perforated belt 136 past the vacuum means 28 and the vacuum/blower means 34 in order to support the cut label thereagainst. Simultaneous activation of the vacuum means 28 and the vacuum/blower means 34 is provided by the control system 50. At a preselected time, thereafter, the heater 154 is activated for a period of time $t_0$ in order to activate the delayed action adhesive to a tacky state.

After activation thereof, the cut individual label passes to the ejection station 34 whereupon the control system 50 reverses the air flow through the belt by means of the vacuum/blower 38 to eject the label 30 onto the goods 40 which have been moved into position in a coordinated manner by the control system 50.

Also shown in FIG. 6 is the operation of the sensor 86 when the terminus of the linear thermosensitive paper 14 is detected thereby. The signal to the control system 50 shuts down the operation of the thermal printer label and applicator 10 via the power switch 166 to allow for replenishment of the linerless thermosensitive paper 14. In case the operation is stopped, when power switch 166 is off, the solenoid 122 and the motor 168 are off, and the roller 82 and the print head 90 move upward so that they are off from the paper 14.

Although there has been described hereinabove a specific thermal printer and label applicator in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A thermal printer and label applicator for use with thermosensitive recording paper comprising a substrate, a thermosensitive color-forming layer disposed on one side of the substrate, and a delayed action adhesive disposed on an opposite side of the substrate, said delayed action adhesive becoming tacky upon the application of heat thereto, said printer and applicator comprising:

transport means for moving the thermosensitive recording paper from a stack or roll thereof to a printing station and a cutting station, said transport means including a pair of drive rollers disposed for engaging the thermosensitive recording paper therebetween;

thermal print head means disposed at said printing station for causing a preselected heating pattern in said thermosensitive recording paper in order to form desired visible images in the thermosensitive color-forming layer;

lever means for coordinated engagement and disengagement of the thermal print head means and the drive roller means with the thermosensitive recording paper, said lever means including a first and a second lever, said first lever having one end thereof attached to a thermal print head, said second lever having one end thereof attached to one of said drive rollers, said first and second levers having an opposite end thereof attached to a common shaft and each lever being mounted on a first and second pivot, respectively, with said first and second pivots being disposed between the thermal print head and the drive roller means, said lever means further including means for moving the shaft in order to cause the first and second levers to rotate about the first and second pivots, respectively, to simultaneously engage and disengage the thermal print head means and the drive roller means with the thermosensitive recording paper;

cutting means disposed at said cutting station for cutting the thermosensitive recording paper into separated individual labels with visible images thereon;

means for handling the separated individual labels without contact with the delayed action adhesive;

heating means disposed at an adhesive activation station for heating delayed action adhesive disposed on said separated individual labels in order to cause the delayed action adhesive to become tacky; and, means for discharging the separated individual labels with tacky adhesive thereon.

2. The thermal printer and label applicator according to claim 1 wherein the means for handling the separated individual labels comprises vacuum means.

3. The thermal printer and label applicator according to claim 2 wherein the means for discharging the separated individual labels includes means for applying the separated individual labels with tacky adhesive to goods without contact with the tacky delayed action adhesive.

4. The thermal printer and label applicator according to claim 3 wherein the means for applying the separated individual labels with tacky adhesive to goods comprises vacuum/blower means for causing airborne transport of the individual separated labels with tacky adhesive onto the goods.

5. A thermal printer and label applicator comprising:

transport means for moving linerless thermosensitive paper from a stack or roll thereof to a printing station and a cutting station, said transport means including a pair of drive rollers disposed for engaging the thermosensitive recording paper therebetween;

thermal print head means disposed at said printing station for causing a preselected heating pattern in said linerless thermosensitive paper in order to form desired visible images thereon;

lever means for coordinated engagement and disengagement of the thermal print head means and the drive roller means with the thermosensitive recording paper, said lever means including a first and a second lever, said first lever having one end thereof attached to a thermal print head, said second lever having one end thereof attached to one of said drive rollers, said first and second levers having an opposite end thereof attached to a common shaft and each lever being mounted on a first and second pivot, respectively, with said first and second pivots being disposed between the thermal print head and the drive roller means, said lever means further including means for moving the shaft in order to cause the first and second levers to rotate about the first and second pivots, respectively, to simultaneously engage and disengage the thermal print head means and the drive roller means with the thermosensitive recording paper;

cutting means disposed at said cutting station for cutting the linerless thermosensitive paper into separated individual labels with visible images thereon;

vacuum means for transporting the separated individual labels from the cutting station to an adhesive activation station and thereafter to a label ejection station;

heating means disposed at said adhesive activation station for heating delayed action adhesive disposed on said separated individual labels in order to cause the delayed action adhesive to become tacky;

vacuum/blower means disposed at said label ejection station for causing airborne transport of the individual separated labels with tacky adhesive onto goods;

conveyor means for placing goods in a position to receive the airborne labels, said conveyor means including weighing means for determining the weight of the goods; and control means interconnected with said transport means, thermal print head means, cutting means, vacuum means, heating means, vacuum/blower means and conveyor means for synchronizing the operation thereof so that the weight of the goods is indicated by the desired visible image created on the separated individual labels and the labels are placed on corresponding goods having the indicated weight.

6. The thermal printer and label applicator according to claim 5 further comprising perforated belt means disposed in an operative relationship with said vacuum means and said vacuum/blower means for enabling air flow through the perforated belt means via the perforations therein from a side on which the individual separated labels are held to an opposite side thereof, said air flow being controlled by said control means to provide cooling of the belt in order to prevent creation of undesired visible images in the separated individual lables.

7. The thermal printer and label applicator according to claim 6 wherein the vacuum means and the vacuum/-blower means are disposed in a spaced-apart relationship and said vacuum/blower means is configured for reversing the air flow through the perforated belt in order to blow the separated individual labels therefrom in response to a signal from the control means.

8. A thermal printer and label applicator comprising:

a roll of thermosensitive recording paper comprising a substrate, a thermosensitive color-forming layer disposed on one side of the substrate, a heat-reflecting layer disposed on an opposite side of the substrate and a delayed action adhesive disposed on said heat-reflecting layer, said delayed action adhesive becoming tacky upon the application of heat thereto;

transport means for moving the thermosensitive sensitive recording paper from a stack or roll thereof to a printing station and a cutting station, said transport means including a pair of drive rollers disposed for engaging the thermosensitive recording paper therebetween and for moving unsupported thermosensitive recording paper to a position for engagement with the thermal print head means;

means for removing a curl, in the thermosensitive recording paper caused, in part, by rolled storage thereof;

thermal print head means disposed at said printing station for causing a preselected heating pattern in said thermosensitive recording paper in order to form desired visible images thereon;

cutting means disposed at said cutting station for cutting the thermosensitive recording paper into separated individual labels with visible images thereon;

vacuum means for transporting the separated individual labels from the cutting station to an adhesive activation station and thereafter to a label ejection station;

heating means disposed at said adhesive activation station for heating delayed action adhesive disposed on said separated individual labels in order to cause the delayed action adhesive to become tacky;

vacuum/blower means disposed at said label ejection station for causing airborne transport of the individual separated labels with tacky adhesive onto goods;

conveyor means for placing goods in a position to receive the airborne labels, said conveyor means including weighing means for determining the weight of the goods;

control means interconnected with said transport means, thermal print head means, cutting means vacuum means heating means, vacuum/blower means and conveyor means for synchronizing the operation thereof so that the weight of the goods is indicated by the visible image created on the separated individual labels and the labels are placed on corresponding goods having the indicated weight;

perforated belt means disposed in an operative relationship with said vacuum means and said vacuum/blower means for enabling air flow through the perforated belt means via the perforations therein from a side on which the individual separated labels are held to an opposite side thereof, said air flow being controlled by said control means to provide cooling of the belt in order to prevent creation of undesired visible images in the separated individual labels;

vacuum means and the vacuum/blower means being disposed in a spaced-apart relationship, with said vacuum means and said vacuum/blower means being configured for reversing the air flow through the perforated belt in order to blow the separated individual labels therefrom in response to a signal from the control means; and lever means for coordinated engagement and disengagement of the thermal print head means and the drive roller means with the thermosensitive recording paper, said lever means including a first and a second lever, said first lever having one end thereof attached to a thermal print head, said second lever having one end thereof attached to one of said drive rollers, said first and second levers having an opposite end thereof attached to a common shaft and each lever being mounted on a first and second pivot, respectively, with said first and second pivots being disposed between the thermal print head and the drive roller means, said lever means further including means for moving the shaft in order to cause the first and second levers to rotate about the first and second pivots, respectively, to simultaneously engage and disengage the thermal print head means and the drive roller means with the thermosensitive recording paper.

9. The thermal printer and label applicator according to claim 8 wherein the means for removing a curl in the thermosensitive recording paper is disposed between the roll of thermosensitive recording paper and the transport means and said means for removing a curl in the thermosensitive recording paper and the transport means are operative in combination for moving unsupported thermosensitive recording paper to a position for engagement with the thermal print head means.

* * * * *